(12) United States Patent
Berning et al.

(10) Patent No.: US 12,366,042 B2
(45) Date of Patent: *Jul. 22, 2025

(54) SELF-PROPELLED CONSTRUCTION MACHINE AND METHOD FOR WORKING A GROUND PAVEMENT

(71) Applicant: Wirtgen GmbH, Windhagen (DE)

(72) Inventors: Christian Berning, Zülpich (DE); Hanjo Held, Windhagen (DE); René Müller, Vettelschoss (DE)

(73) Assignee: Wirtgen GmbH, Windhagen (DE)

( * ) Notice: Subject to any disclaimer, the term of this patent is extended or adjusted under 35 U.S.C. 154(b) by 867 days.

This patent is subject to a terminal disclaimer.

(21) Appl. No.: 17/409,911

(22) Filed: Aug. 24, 2021

(65) Prior Publication Data

US 2022/0025590 A1 Jan. 27, 2022

Related U.S. Application Data

(63) Continuation of application No. 16/661,168, filed on Oct. 23, 2019, now Pat. No. 11,105,052.

(30) Foreign Application Priority Data

Dec. 21, 2018 (DE) ...................... 10 2018 222 875.2

(51) Int. Cl.
*E01C 23/088* (2006.01)
*E01C 23/12* (2006.01)
(Continued)

(52) U.S. Cl.
CPC .......... *E01C 23/088* (2013.01); *E01C 23/127* (2013.01); *B28D 1/18* (2013.01);
(Continued)

(58) Field of Classification Search
CPC ............................ E01C 23/088; E01C 23/127
(Continued)

(56) References Cited

U.S. PATENT DOCUMENTS 9,039,320 B2    5/2015    Snoeck et al.
9,670,630 B2    6/2017    Berning et al.
(Continued)

FOREIGN PATENT DOCUMENTS

AU    2007249060 A1    7/2008
CN    102535319 A      7/2012
(Continued)

OTHER PUBLICATIONS

China Search Report in corresponding patent application No. 201911099595X, dated Apr. 13, 2021, 3 pages (not prior art).
(Continued)

*Primary Examiner* — Sunil Singh
(74) *Attorney, Agent, or Firm* — Gary L. Montle; Lucian Wayne Beavers; Patterson Intellectual Property Law, PC

(57) ABSTRACT

In a self-propelled construction machine (1), in particular road milling machine or surface miner, for working a ground pavement, comprising a milling drum (10), which is mounted in a machine frame, wherein a milling cut develops during milling of the ground pavement with the milling drum (10), wherein the milling drum (10) comprises a first and a second end side, at least a first measuring device, which is arranged next to the first end side of the milling drum (10) and measures the distance of the machine frame relative to the ground pavement next to the first end side of the milling drum (10), at least a second measuring device, which is arranged next to the second end side of the milling drum (10) and measures the distance of the machine frame relative to the ground pavement next to the second end side of the milling drum (10), and a control device (40) for
(Continued)

controlling the milling depth, wherein, in a first milling operation, the control device (40) determines the milling depth by means of measurements performed by the first and the second measuring device, it is provided for the following features to be achieved: a second milling operation is detectable by means of the control device (40), in which the milling drum (10) is positioned on an as yet non-milled milling cut that is arranged next to a previously milled milling cut, wherein the control device (40), as soon as the second milling operation is detected, uses measurements performed by at least a third measuring device in lieu of the first and/or the second measuring device for determining the milling depth.

20 Claims, 4 Drawing Sheets

(51) Int. Cl.
  *B28D 1/18* (2006.01)
  *E01C 19/00* (2006.01)
  *E21C 25/10* (2006.01)
  *G01B 5/18* (2006.01)

(52) U.S. Cl.
  CPC ........ *B60G 2300/09* (2013.01); *E01C 19/006* (2013.01); *E21C 25/10* (2013.01); *G01B 5/18* (2013.01)

(58) Field of Classification Search
  USPC ............... 299/1.5, 39.4, 39.6; 404/84.05
  See application file for complete search history.

(56) References Cited

U.S. PATENT DOCUMENTS

| | | | |
|---|---|---|---|
| 9,879,391 | B2 | 1/2018 | Berning et al. |
| 11,105,052 | B2* | 8/2021 | Berning ............... E01C 23/088 |
| 2002/0047301 | A1 | 4/2002 | Davis |
| 2013/0294830 | A1 | 11/2013 | Jurasz et al. |
| 2015/0115689 | A1 | 4/2015 | Snoeck et al. |
| 2020/0199828 | A1 | 6/2020 | Berning et al. |

FOREIGN PATENT DOCUMENTS

| | | | |
|---|---|---|---|
| CN | 203049438 U | 7/2013 | |
| CN | 212000543 U | 11/2020 | |
| DE | 102006020293 A1 | 11/2007 | |
| DE | 102012100934 A1 | 8/2013 | |
| EP | 547378 A1 | 6/1993 | |
| EP | 2037042 A1 * | 3/2009 | ........... E01C 19/004 |
| EP | 2716816 A1 | 4/2014 | |
| EP | 2722441 A1 | 4/2014 | |

OTHER PUBLICATIONS

European Search Report on corresponding patent application No. EP 19 20 4232, dated Apr. 20, 2020, 3 pages (not prior art).

* cited by examiner

SELF-PROPELLED CONSTRUCTION MACHINE AND METHOD FOR WORKING A GROUND PAVEMENT

CROSS-REFERENCES TO RELATED APPLICATIONS

This application is a continuation of U.S. patent application Ser. No. 16/661,168, filed Oct. 23, 2019, and further claims benefit of German Patent Application No. 10 2018 222 875.2, filed Dec. 21, 2018, and which is hereby incorporated by reference.

FIELD OF THE DISCLOSURE

The invention relates to a self-propelled construction machine as disclosed herein, as well as to a method for working a ground pavement.

BACKGROUND

Construction machines, particularly road milling machines or surface miners for working a ground pavement, are known which comprise a milling drum that is mounted in a machine frame, wherein the milling drum comprises a first and a second end side. A milling cut develops during milling of the ground pavement with the milling drum. Said construction machines comprise, in most cases, at least a first measuring device, which is arranged next to the first end side of the milling drum and measures the distance of the machine frame relative to the ground pavement next to the first end side of the milling drum, and at least a second measuring device, which is arranged next to the second end side of the milling drum and measures the distance of the machine frame relative to the ground pavement next to the second end side of the milling drum. Furthermore, a control device for controlling the milling depth is provided in most cases, wherein, in a first milling operation, the control device determines the milling depth by means of measurements performed by the first and the second measuring device.

In the case of known construction machines, there is frequently the problem that the measurement of the milling depth is not sufficiently precise in all operating situations.

It is therefore an object of the present invention to improve the reliability of the milling depth measurement.

BRIEF SUMMARY

The invention advantageously provides for a second milling operation to be detectable by means of the control device, in which the milling drum is positioned on an as yet non-milled milling cut that is arranged next to a previously milled milling cut, wherein the control device, as soon as the second milling operation is detected, uses measurements performed by at least a third measuring device in lieu of the first and/or the second measuring device for determining the milling depth.

The present invention has the advantage that the milling depth can be determined more precisely in particular in the case of a second milling operation in which the milling drum is positioned on an as yet non-milled milling cut that is arranged next to a previously milled milling cut. This is due to the fact that, as first and second measuring device, measuring devices are often used of which one measuring device is arranged, in said milling operation, both above the non-milled milling cut and above the previously milled milling cut. The milling depth can therefore not be determined to a sufficient degree of precision using one of said measuring devices. In this case, the milling depth measurement can be improved in that said first or second measuring device, which is not capable of correctly determining the milling depth, is not used, but a third measuring device is used.

The first or second measuring device may be arranged, for example, on a beam which rests on the ground next to the milling drum and measures the distance of the machine frame to the ground pavement. Alternatively, multiple distance sensors arranged behind one another as seen in the direction of travel may also be provided on each side of the construction machine, which is described, for example, in EP 0 547 378 A1.

The invention also covers the case that the as yet non-milled milling cut on which the milling drum is positioned, which is arranged next to a previously milled milling cut, may have already been milled in a previous operational step. The ground pavement may be milled off in multiple operational steps. When milling off the ground pavement in two operational steps, a first layer of the ground pavement is initially milled off in a first operational step, for example, in multiple milling cuts. Thereafter, in a second operational step, an additional layer of the ground pavement, which is arranged underneath the first layer of the ground pavement, is also milled off in multiple milling cuts.

A first side plate as first edge protection may also be arranged on the first end side of the milling drum, and a second side plate as second edge protection may be arranged on the second end side of the milling drum, wherein the first and the second side plates are each height-adjustable relative to the machine frame and each rest on the ground pavement next to the milling drum. The at least one first measuring device may be arranged on the first side plate, and the at least one second measuring device may be arranged on the second side plate, each measuring the height adjustment of the first and second side plate relative to the machine frame and therefore measuring the distance of the machine frame relative to the ground pavement. The first side plate may also be part of the first measuring device, and the second side plate may also be part of the second measuring device. The first and second measuring device may each comprise at least one sensor. The at least one sensor may be a sensor which detects the adjustment of the side plate relative to the machine frame. The at least one sensor may, for example, be a wire-rope sensor; alternatively, the adjustment of the side plate in relation to the machine frame may, however, also be detected by other tactile or non-contact sensors (e.g. ultrasonic sensor). In each of these cases, the side plate would be part of the measuring device.

As a further alternative, a sensor arranged on the machine frame may also directly measure the distance to the ground pavement. In this case, the respective side plate would then not be part of the measuring device.

For detecting the second milling operation, in which the milling drum is positioned on an as yet non-milled milling cut that is arranged next to a previously milled milling cut, the control device may evaluate the measured and/or the specified values of the first and/or the second measuring device. The measured and/or the specified values of the first and/or the second measuring device may be compared, for example, with stored reference values. The measured values may also be termed actual values, and the specified values may also be termed set values.

For detecting the second milling operation, in which the milling drum is positioned on an as yet non-milled milling cut that is arranged next to a previously milled milling cut, the control device may calculate the difference between the specified and the measured values of the first and/or the second measuring device and compare the same with a specified reference value.

The reference value may be determined by means of previous tests.

The ground pavement to be milled, for example, a road, is typically wider than the milling drum width and thus the working width of the road milling machine. Multiple milling cuts must therefore be milled next to one another in order to completely mill off the surface. If closed-loop control of the milling depth is effected via the measuring devices described above, one of the measuring devices is located on previously milled ground pavement when the second cut next to a previously milled cut is milled, whilst the second measuring device is located on the non-milled ground pavement. In order to achieve the desired milling result, a milling depth of zero is therefore specified on the side that is located on milled ground pavement, and a milling depth corresponding to the set value, that is, the set milling depth, is specified on the other side.

If a measuring device rests on a previously milled milling cut, said measuring device measures a milling depth of almost or equal to zero. If the measuring device rests on the non-milled ground pavement, said measuring device would measure the set value or almost the set value. Especially during positioning, that is, at the start of the second milling cut, it may happen that the measuring device on that side which, in the further milling process, scans the previously milled surface is arranged both above the milled ground pavement and above the non-milled ground pavement and can therefore neither correctly determine the distance to the milled ground pavement nor correctly determine the distance to the non-milled ground pavement. The measured value is then between zero and the set value. Almost zero means that the value is close to zero, preferably deviating from zero by a maximum of +/−1.5 cm. A measured value that is to be almost the set value preferably deviates from the set value by a maximum of +/−1.5 cm.

For detecting the second milling operation, in which the milling drum is positioned on an as yet non-milled milling cut that is arranged next to a previously milled milling cut, the control device may verify whether the specified value for the milling depth, that is, the set value, is almost or equal to zero for the first measuring device, and the measured value for the milling depth, that is, the actual value, is equal to or almost the set value for the second measuring device, or whether the specified value for the milling depth, that is, the set value, is almost or equal to zero for the second measuring device, and the measured value for the milling depth, that is, the actual value, is equal to or almost the set value for the first measuring device.

Alternatively or additionally, it may also be verified whether the first or second measuring device, for which the specified value for the milling depth, that is, the set value, is almost or equal to zero, exhibits a measured value for the milling depth, that is, an actual value, of between zero and the set value of the other of the first or second measuring device, wherein the value is preferably larger than 1.5 cm. It is clear in this context that the milling drum is lowered further in the case of a larger milling depth. A larger value for the milling depth therefore signifies a deeper cut.

The first measuring device may comprise at least two sensors, and the second measuring device may likewise comprise at least two sensors which are each arranged behind one another as seen in the direction of travel, wherein the control device, for detecting the second milling operation, may evaluate the measured and/or the specified values of the at least two sensors of the first and/or the measured and/or the specified values of the at least two sensors of the second measuring device.

The difference in the values of the respective two sensors may be calculated and compared with a reference value. In this way, the second milling operation can be detected.

The respective sensors may measure the distance of the machine frame relative to the ground pavement. The first side plate may also be part of the first measuring device, and the second side plate may also be part of the second measuring device. The at least two sensors per measuring device may be sensors which detect the adjustment of the side plate relative to the machine frame. The at least two sensors per measuring device may, for example, be wire-rope sensors. Alternatively, the adjustment of the side plate in relation to the machine frame may, however, also be detected by other tactile or non-contact sensors (e.g. ultrasonic sensor). In each of these cases, the side plate would be part of the measuring device.

As a further alternative, the at least two sensors per measuring device may also be sensors arranged on the machine frame which directly measure the distance to the ground pavement. In this case, the respective side plate is then not part of the measuring device.

The control device may verify based on GPS data whether the second milling operation applies, wherein the control device may compare at least the current GPS data of the construction machine with stored GPS data of previously milled milling cuts.

A profile detection sensor may be arranged on the machine frame, which detects the profile of the ground surface in front of the milling drum as seen in the direction of travel, wherein the control device may ascertain, by means of the profile detection sensor, whether the second milling operation applies.

Alternatively or additionally, a mark may also be applied during positioning in the first cut. Said mark (such as an RFID chip) may then be used during positioning in the second cut for detecting the second milling operation.

The at least one third measuring device may measure the transverse inclination of the machine frame. According to the present invention, closed-loop control of the milling depth in the second milling operation is thus effected, on the one hand, by means of one of the first and second measuring devices and, on the other hand, by means of the third measuring device, wherein closed-loop control of the milling depth on the one end side of the milling drum is effected by means of the first or second measuring device, and closed-loop control of the milling depth on the other side is effected by means of monitoring the transverse inclination. In the process, the transverse inclination is preferably kept constant. To this end, the transverse inclination may be measured in absolute terms, that is, in relation to the Earth's centre, or preferably relative to the non-milled, or milled, ground pavement.

The at least one third measuring device may be arranged on a scraper which is arranged behind the milling drum as seen in the direction of travel, is adjustable in height and rests on the ground surface milled by the milling drum. The scraper thus engages with the milling cut created by the milling drum and levels off the bottom of the milling cut so that no milled-off material remains in the milling cut behind the scraper.

The scraper may also be part of the third measuring device. The third measuring device may comprise at least one sensor arranged on the machine frame which detects the adjustment of the scraper relative to the machine frame.

As a further alternative, the at least one sensor may also measure the distance of the machine frame to the ground surface itself. In this case, the scraper is then not part of the measuring device.

The third measuring device may comprise at least two sensors which are arranged on the scraper, which are arranged next to one another in a plane extending orthogonally to the direction of travel. The respective sensors may measure the distance of the machine frame relative to the ground pavement. The at least two sensors may be sensors which detect the adjustment of the scraper relative to the machine frame. The at least two sensors may, for example, be wire-rope sensors. Alternatively, the adjustment of the scraper in relation to the machine frame may, however, also be detected by other tactile or non-contact sensors (e.g. ultrasonic sensor). In these cases, the scraper would be part of the third measuring device.

As a further alternative, the at least two sensors may also be sensors arranged on the machine frame which directly measure the distance to the ground pavement. These sensors may also be arranged next to one another in a plane extending orthogonally to the direction of travel.

The construction machine may comprise at least three travelling devices, which may be adjustable in height relative to the machine frame. Lifting columns may be provided for the purpose of height adjustment, by means of which the machine frame is adjustable relative to the travelling devices and is height-adjustable as a result. In this way, the milling drum mounted on the machine frame can be adjusted in height.

The adjustments of the lifting columns of the ground-engaging units relative to the ground pavement may also be used as measurements for the third measuring device.

Provided that the second milling operation has been detected, the transverse and/or longitudinal inclination of the construction machine is preferably kept constant.

As soon as the control device detects the second milling operation, the control device may verify whether the first or the second measuring device is arranged closer to the previously milled milling cut and then, in the second milling operation, for determining the milling depth, use the measurements of the third measuring device and of that measuring device which is arranged further away from the previously milled milling cut. In particular, the control device may determine that of the first and second measuring devices for which a set value of zero or almost zero is adjusted and then, in the second milling operation, use the third measuring device and the other of the first and second measuring devices.

The specified and measured values of the first and second measuring device may be used for verifying whether the first or the second measuring device is arranged closer to the previously milled milling cut. Alternatively, a profile detection sensor may also be provided, which may be arranged on the machine frame, which detects the profile of the ground surface in front of the milling drum as seen in the direction of travel. As a further alternative, GPS data may be used, wherein the control device may compare the current GPS data of the construction machine with stored GPS data of previously milled milling cuts.

The control device may verify whether the construction machine, after the second milling operation, mills in the first milling operation once again, and that the control device, as soon as renewed milling in the first milling operation is ascertained, determines the milling depth once again by means of measurements performed by the first and the second measuring device.

For ascertaining renewed milling in the first milling operation, the control device may verify the time and/or the distance travelled by the construction machine and compare the same with a specified time and/or travel distance.

The specified travel distance may be, for example, 1.5 m.

For ascertaining renewed milling in the first milling operation, the control device may verify the measured value of the first or second measuring device which has been replaced, wherein it may be verified whether the measured value corresponds to the set value or a value in proximity to the set value, preferably not deviating from the set value by more than +/−1.5 cm. As soon as the measuring device rests completely on the milled ground pavement, the measured milling depth should be equal to or almost zero.

According to the present invention, a method for working ground pavements with a self-propelled construction machine, in particular road milling machine or surface miner, may also be provided, in which a milling drum for milling the ground pavement mills a milling cut, wherein at least a first measuring device is arranged next to a first end side of the milling drum, and at least a second measuring device is arranged next to a second end side of the milling drum, each of which measures the distance of the machine frame relative to the ground pavement next to the first end side or next to the second end side of the milling drum, respectively, wherein the milling depth is determined, in a first milling operation, by means of measurements performed by the first and the second measuring device. According to the present invention, it may be advantageously provided that a second milling operation may be detected in which the milling drum is positioned on an as yet non-milled milling cut that is arranged next to a previously milled milling cut, wherein, as soon as the second milling operation is detected, measurements performed by at least a third measuring device are used in lieu of the first and/or the second measuring device for determining the milling depth.

For detecting the second milling operation, in which the milling drum is positioned on an as yet non-milled milling cut that is arranged next to a previously milled milling cut, the measured and/or the specified values of the first and/or the second measuring device may be evaluated. The measured and/or the specified values of the first and/or the second measuring device may be compared with stored reference values.

For detecting the second milling operation, in which the milling drum is positioned on an as yet non-milled milling cut that is arranged next to a previously milled milling cut, the difference between the specified and the measured values of the first and/or the second measuring device may be calculated and compared with a specified reference value.

As has been described above, the reference value may be determined by means of tests.

For detecting the second milling operation, it may be verified whether the specified value for the milling depth, that is, the set value, is almost or equal to zero for the first measuring device, and the measured value for the milling depth, that is, the actual value, is equal to or almost the set value for the second measuring device, or whether the specified value for the milling depth, that is, the set value, is almost or equal to zero for the second measuring device, and the measured value for the milling depth, that is, the actual value, is equal to or almost the set value for the first measuring device.

Alternatively or additionally, it may also be verified whether the first or second measuring device, for which the specified value for the milling depth, that is, the set value, is almost or equal to zero, exhibits a measured value for the milling depth, that is, an actual value, of between zero and the set value of the other of the first or second measuring device, wherein the value is preferably larger than 1.5 cm.

Alternatively, it may also be verified based on GPS data whether the construction machine mills in the second milling operation, wherein at least the current GPS data of the construction machine may be compared with stored GPS data of previously milled milling cuts.

The profile of the ground surface in front of the milling drum as seen in the direction of travel may also be detected, wherein it may be ascertained, by means of the profile of the ground surface in front of the milling drum as seen in the direction of travel, whether the construction machine mills in the second milling operation.

BRIEF DESCRIPTION OF THE SEVERAL VIEWS OF THE DRAWINGS

In the following, one embodiment of the present invention is explained in more detail with reference to the drawings. The following is shown schematically.

DETAILED DESCRIPTION

Figure 1:
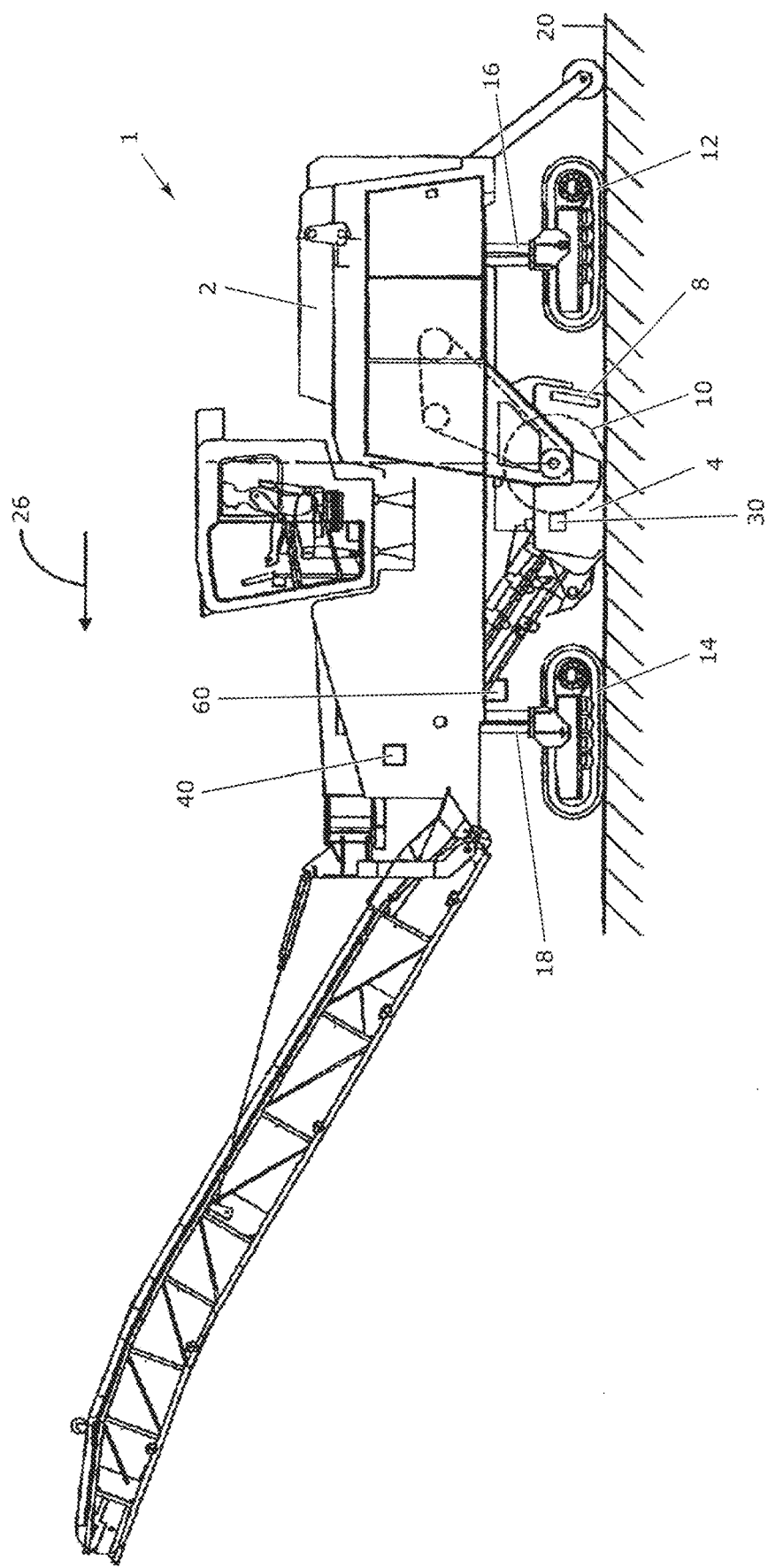
FIG. 1 shows a construction machine according to the present invention.

FIG. 1 shows a self-propelled construction machine 1 for working a ground pavement 20. The construction machine 1 comprises a machine frame 2 and at least three travelling devices 12, 14. As depicted in the embodiment depicted, the construction machine may, however, also comprise four travelling devices 12, 14. Said travelling devices 12, 14 may be wheels or tracked ground-engaging units.

At least two travelling devices 12, 14 may be height-adjustable. In the embodiment depicted, all four travelling devices 12, 14 are height-adjustable. Lifting columns 16, 18 are provided for the purpose of height adjustment, by means of which the machine frame 2 is adjustable relative to the travelling devices 12, 14 and is height-adjustable as a result. In this way, the milling drum 10 mounted on the machine frame 2 can be adjusted in height.

Furthermore, the construction machine 1 comprises a control device 40 which is described in more detail in the following.

Figure 2:
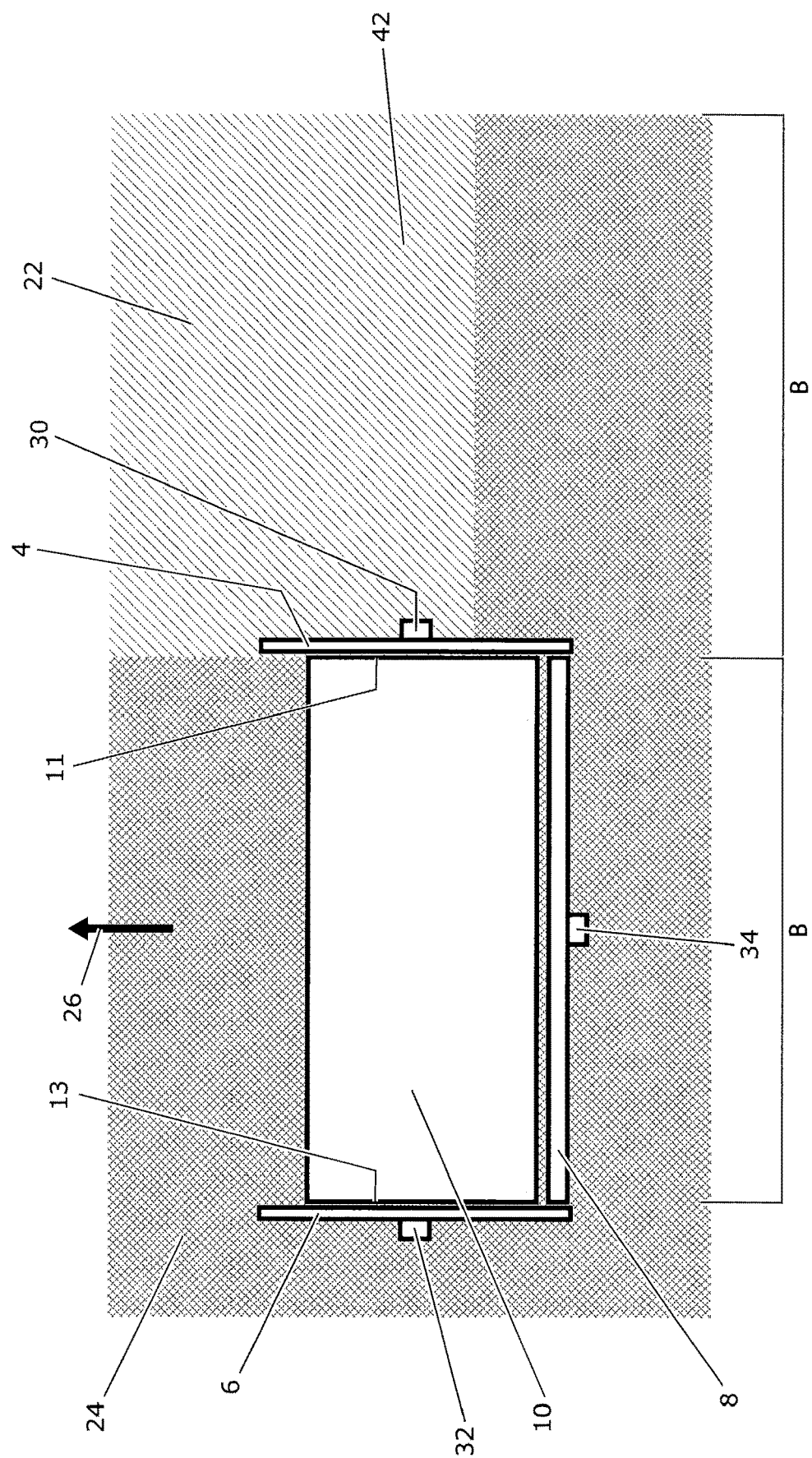
FIG. 2 shows a purely schematic top view of the milled and the non-milled ground pavement, as well as of the milling drum with side plates and scraper.

FIG. 2 shows a top view of a ground pavement 20 as well as of a schematically depicted milling drum 10 with side plates 4, 6 and scraper 8. The ground pavement 20 may be both the previously milled ground pavement 22 and the as yet non-milled ground pavement 24. As described earlier with regard to FIG. 1, the milling drum 10 is mounted in the machine frame 2. A milling cut 42 develops during milling of the ground pavement 20 with the milling drum 10. This can be inferred from FIG. 2. The milling cut 42 exhibits a width B which corresponds to the width B of the milling drum 10. The milling cut 42 is the cut which develops through milling with the milling drum.

The milling drum 10 comprises a first end side 11 and a second end side 13.

At least a first measuring device 30 is provided, which is arranged next to the first end side 11 of the milling drum 10 and measures the distance of the machine frame 2 relative to the ground pavement 20 next to the first end side 11 of the milling drum 10, wherein the ground pavement 20 may be the previously milled ground pavement 22 or the as-yet non-milled ground pavement 24.

At least a second measuring device 32 is furthermore provided, which is arranged next to the second end side 13 of the milling drum 10 and measures the distance of the machine frame 2 relative to the ground pavement 20 next to the second end side 13 of the milling drum, wherein the ground pavement 20 may be the previously milled ground pavement 22 or the as-yet non-milled ground pavement 24.

The depicted measuring devices 30, 32 measure the height adjustment of the side plates 4, 6 relative to the machine frame 2. The side plates 4, 6 preferably rest on the ground pavement 20. As a result of the milling drum 10 being mounted in the machine frame 2, the adjustment of the side plates 4, 6 relative to the machine frame 2 may be used for determining the distance between the machine frame 2 and the ground pavement 20. The measuring devices 30, 32 may be sensors attached to the side plates 4, 6. Wire-rope sensors, for example, may be attached to the respective side plate 4, 6, which measure the adjustment of the respective side plate 4, 6. Alternatively, other sensors may also be provided which measure the adjustment of the respective side plate 4, 6.

In the present case, the side plates 4, 6 are preferably part of the first or second measuring device 30, 32. The first and/or second measuring device may also not be arranged on the side plates 4, 6. Any other kind of sensing device may, for example, also be used as the first and/or second measuring device. A beam each may, for example, also be arranged next to the respective end side 11, 13 of the milling drum 10, by means of which the distance from the machine frame 2 to the ground pavement 20 is measurable. The construction machine exhibits a longitudinal direction, which extends in the direction of travel, and a transverse direction, which extends orthogonal to the same. According to the present invention, the term next to the respective end side means in the transverse direction next to a plane which extends through the respective end side, wherein the measuring device may also indeed be arranged, at least in part, next to the end side in the transverse direction, but may also be arranged in front of or behind the milling drum in the longitudinal direction.

The above-described control device 40 is provided for controlling the milling depth, wherein, in a first milling operation, the control device 40 determines the milling depth by means of measurements performed by the first and the second measuring device 30, 32.

In FIG. 2, the milling drum is positioned in an as-yet non-milled milling cut that is arranged next to a previously milled milling cut 42.

A second milling operation may be detectable by means of the control device 40, in which the milling drum 10 is positioned on an as-yet non-milled milling cut that is arranged next to a previously milled milling cut 42, wherein the control device 40, as soon as the second milling operation is detected, uses measurements performed by at least a third measuring device 34 in lieu of the first and/or the second measuring device 30, 32 for determining the milling depth.

In the embodiment depicted, the milling drum 10 comprises a side plate 4 designed as edge protection on the first end side 11. Furthermore, the milling drum 10 comprises a side plate 6 likewise designed as edge protection on the second end side 13. A scraper 8 is arranged behind the milling drum 10 as seen in the direction of travel 26, which rests on the ground pavement milled with the milling drum 10. In FIG. 2, the scraper 8 rests on the as-yet non-milled ground pavement 24, since the milling drum has not yet milled the ground pavement 20 and the milling drum is positioned on a new milling cut.

The first measuring device 30 is arranged on the side plate 4. The second measuring device 32 is arranged on the second side plate 6. The third measuring device 34 is arranged on the scraper 8.

As depicted in FIG. 2, the side plate 4 is arranged in part above the non-milled ground pavement 24 and in part above the milled ground pavement 22.

Figure 3:
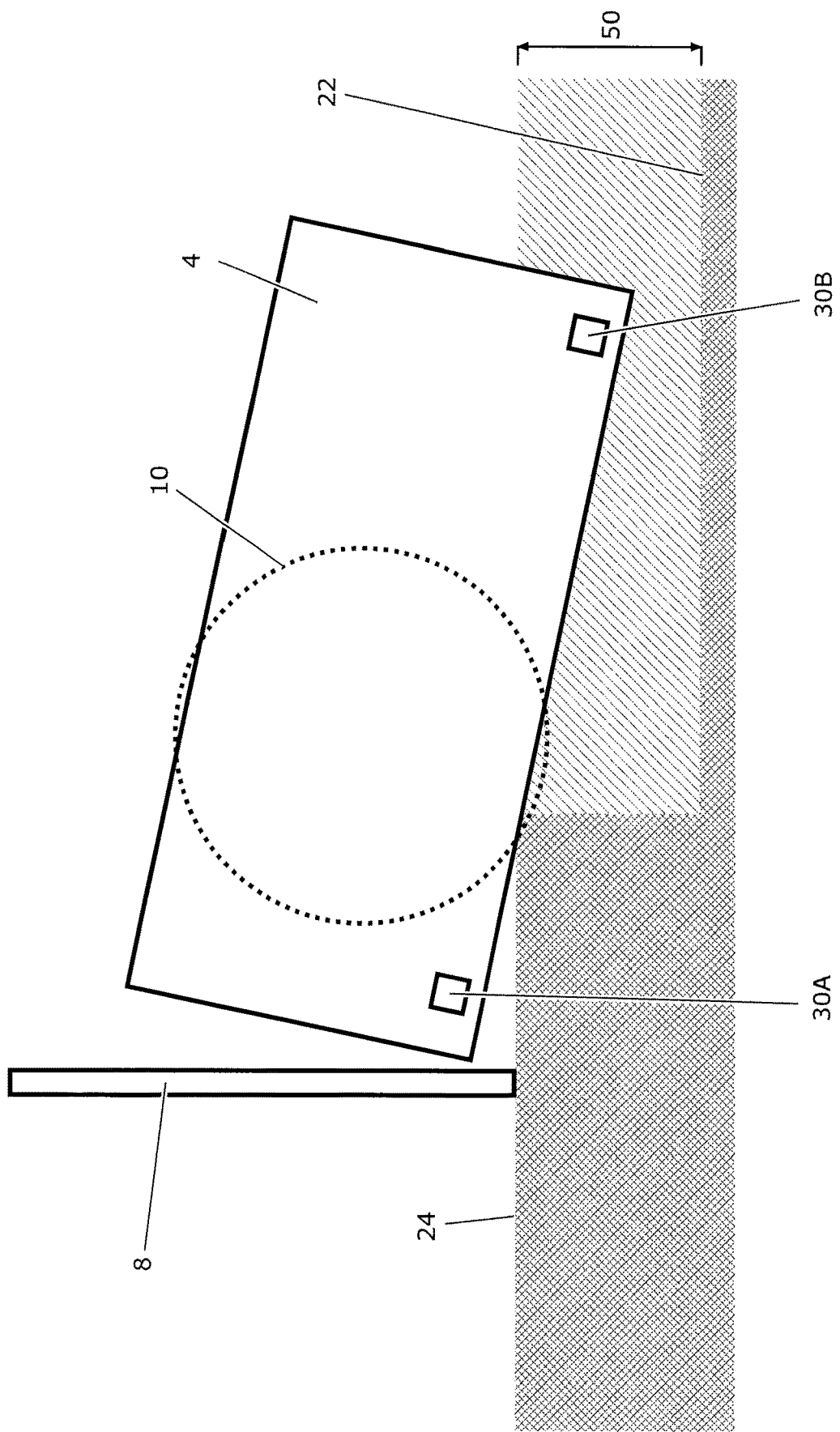
FIG. 3 shows a side view of the schematic design according to FIG. 2.

The side view of the side plate 4 is schematically depicted in FIG. 3. The milling drum 10 is depicted in dashed lines. The side plate 4 is in an inclined position due to the fact that it is arranged in part above the milled ground pavement 22 and in part above the non-milled ground pavement 24. Since the measuring device 30 is arranged on the edge protection and the same is in an inclined position, the measuring device can correctly measure neither the distance of the machine frame 2 to the milled ground pavement 22 nor to the non-milled ground pavement 24. The same problem also exists when the measuring device is arranged on another element next to the end side of the milling drum 10.

The control device 40 detects said second milling operation and, in lieu of the first measuring device 30, uses the measuring device 34.

In this way, the milling depth can be determined much more precisely. The milling depth is, incidentally, indicated by the reference symbol 50.

For detecting the second milling operation, the control device 40 may evaluate the measured and/or the specified values of the first and/or second measuring device. The measured and/or specified values may be compared with reference values. In particular, the difference between the specified and measured values of the respective measuring device 30, 32 may be calculated and compared with specified reference values. The specified reference values may be determined and be stored in advance based on test examples.

Figure 4:
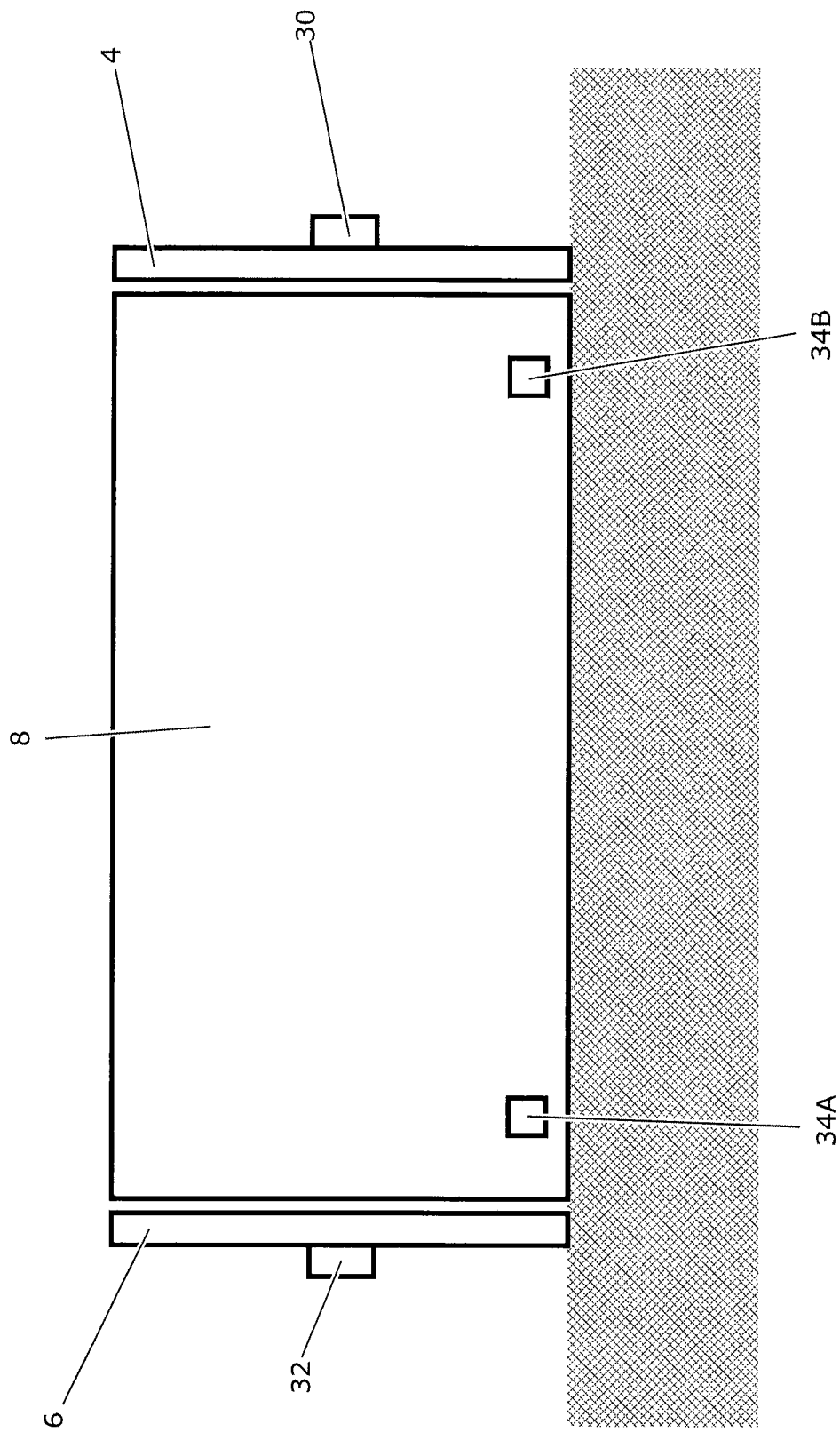
FIG. 4 shows a rear view of the schematic design according to FIG. 2.

For detecting the second milling operation, it may be initially ascertained, for example, on which side the previously milled milling cut 42 is arranged. This may be effected by verifying the specified values or set milling values, respectively. The previously milled milling cut is on that side on which the set value is zero or almost zero. The set value on the right-hand side of the embodiment according to FIG. 4 may thus, for example, be zero.

In this case, the set value on the left-hand side as seen in the direction of travel 26 is larger than zero, and the actual value on the left-hand side as seen in the direction of travel 26 is equal to the set value or almost corresponds to the set value.

Provided that this is detected by means of the control device 40, measurements performed by at least the third measuring device 34 are used, in this case, in lieu of the first measuring device 30 for determining the milling depth.

Alternatively, the first and/or second measuring device 30, 32 may also comprise two sensors each on the side plates 4, 6. As shown in FIG. 3, the measuring device 30 may, for example, comprise two sensors 30A and 30B on the side plate 4. The second measuring device 32 may also comprise two sensors 32A and 32B on the side plate 6. In FIG. 3, the embodiment is depicted with two sensors 30A and 30B, whereas, in FIG. 2, the measuring device 30 comprises only one sensor. Other than that, however, the embodiment according to FIG. 3 corresponds to the embodiment according to FIG. 2.

The two sensors 30A, 30B and 32A, 32B, respectively, are arranged behind one another as seen in the direction of travel. In this way, the inclined position of the respective side plate 4, 6 may be ascertained by means of the sensors 30A and 30B or 32A and 32B, respectively. Provided that the inclined position of the side plate 4, 6 exhibits a specified value, for example, a specified angular position relative to the machine frame 2, it may be ascertained that the second milling operation applies. It may likewise be ascertained that the second milling operation applies when the measured values of the sensors 30A (32A) deviate from the measured values of the sensors 30B (32B) by a value that is larger than a reference value. In this case, too, the control device 40 may use the third measuring device 34 in lieu of the measuring device 30 which comprises the two sensors 30A and 30B.

As a further alternative, GPS data of the previous milling process may also be used. In this way, it may be ascertained where previously milled milling cuts are present and whether a previously milled milling cut is arranged next to the as-yet non-milled milling cut. The previously milled milling cuts may be stored in the data base based on the GPS signals and be updated continuously.

As a further alternative, a profile detection sensor 60 may also be arranged on the machine frame in front of the milling drum 10, which detects the cross-sectional profile of the ground pavement 20 in front of the milling drum. In this way, too, it may be ascertained whether a previously milled milling cut 42 is arranged next to the milling cut to be milled.

As soon as the second milling operation is detected, the measurements performed by the measuring device that is arranged on the side where the previously milled milling cut 42 is arranged are no longer used. A third measuring device 34 is then used in lieu of said measuring device. According to the embodiment, the measurements performed, for example, by the measuring device 30 are replaced by the measurements performed by the measuring device 34, which is arranged on the scraper 8.

If the previously milled milling cut 42 is arranged on the side of the second measuring device 32 and not on the side of the first measuring device 30, the aforementioned also applies to the second measuring device 32.

The third measuring device 34 may, for example, measure the transverse inclination of the machine frame 2. The measuring device 34 may, for example, comprise two sensors 34A and 34B, which are arranged next to one another as seen in the direction of travel 26, preferably on the left-hand and right-hand side of the scraper 8 as seen in the direction of travel 26. The two sensors 34A and 34B may each, at this point, likewise determine the distance of the machine frame to the ground surface. The scraper always rests on the ground pavement. In this way, the transverse inclination of the scraper 8 in relation to the machine frame 2 may be measured, which makes it possible to determine the transverse inclination of the machine frame 2 in relation to the ground pavement. The measuring device 32 provided on the left-hand side as seen in the direction of travel and the measuring device 34 measuring the transverse inclination may be used in the second milling operation for determining the milling depth.

For detecting whether the first milling operation applies again, the construction machine may, for example, travel a specified distance after which the first milling operation is detected automatically. A specified travel distance may be, for example, 1.5 m. As soon as the first milling operation is again detected, the first and the second measuring devices 30, 32 are used again for measuring the milling depth.

For ascertaining whether the first milling operation applies again after the second milling operation, it may also be verified whether the measurements performed by the measuring device that is arranged on the side on which the milled milling cut 42 is arranged, the actual value is equal to the set value or almost corresponds to the set value, in particular, whether the adjusted milling depth of zero corresponds to the measured milling depth. As soon as this applies, the first and the second measuring device 30, 32 may also be used again for measuring the milling depth in the renewed first milling operation. The renewed change-over may, however, also be effected with a time delay or a time lag, respectively.

What is claimed is:

1. A self-propelled construction machine comprising
   a milling drum mounted with respect to a machine frame and comprising a first end side and a second end side, and configured to develop a milling cut during milling of a ground pavement with the milling drum;
   at least a first sensor arranged proximate the first end side of the milling drum and configured to measure a distance of the machine frame relative to the ground pavement next to the first end side of the milling drum;
   at least a second sensor arranged proximate the second end side of the milling drum and configured to measure a distance of the machine frame relative to the ground pavement next to the second end side of the milling drum;
   a controller configured to control a milling depth, and further to:
      in a first milling operation, determine the milling depth via measurements received from the at least first sensor and the at least second sensor,
      automatically detect a second milling operation in which the milling drum is positioned on an as-yet non-milled milling cut that is arranged next to a previously milled milling cut, and
      responsive to automatic detection of the second milling operation, to use measurements received from at least a third sensor for determining the milling depth, in lieu of measurements received from one or more of the at least first sensor and the at least second sensor.

2. The self-propelled construction machine of claim 1, wherein for detecting the second milling operation, the controller is configured to evaluate one or more of measured values and specified values associated with one or more of the at least first sensor and the at least second sensor.

3. The self-propelled construction machine of claim 2, wherein for detecting the second milling operation, the controller calculates the difference between the specified and the measured values of the one or more of the at least first sensor and the at least second sensor, and compares the calculated difference with a specified reference value.

4. The self-propelled construction machine of claim 1, wherein:
   the at least first sensor comprises at least two sensors which are each arranged proximate the first end side of the milling drum and behind one another as seen in the direction of travel,
   the at least second sensor comprises at least two sensors which are each arranged proximate the second end side of the milling drum and behind one another as seen in the direction of travel, and
   the controller is configured, for detecting the second milling operation, to receive measurements from one or more of the at least two sensors proximate the first end side of the milling drum and the at least two sensors proximate the second end side of the milling drum.

5. The self-propelled construction machine of claim 1, wherein the controller is configured to verify whether the second milling operation applies, by comparing current GPS data associated with the construction machine with stored GPS data associated with one or more previously milled milling cuts.

6. The self-propelled construction machine of claim 1, further comprising:
   a profile detection sensor arranged on the machine frame and configured to detect a profile of the ground surface in front of the milling drum as seen in the direction of travel,
   wherein the controller ascertains, via the profile detection sensor, whether the second milling operation applies.

7. The self-propelled construction machine of claim 1, further comprising:
   a first side plate associated with the first end side of the milling drum,
   a second side plate associated with the second end side of the milling drum,
   wherein the first side plate and the second side plate are each height-adjustable relative to the machine frame and each rest on the ground pavement next to the milling drum,
   wherein the at least one first sensor is arranged on the first side plate and configured to measure a height adjustment of the first side plate relative to the machine frame, and
   wherein the at least one second sensor is arranged on the second side plate and configured to measure a height adjustment of the second side plate relative to the machine frame.

8. The self-propelled construction machine of claim 1, wherein the at least third sensor measures a transverse inclination of the machine frame.

9. The self-propelled construction machine of claim 1, wherein:
   the at least third sensor is arranged on a scraper, and
   wherein the scraper is arranged behind the milling drum as seen in the direction of travel, is height-adjustable and rests on the ground surface behind the milling drum.

10. The self-propelled construction machine of claim 9, wherein the at least third sensor comprises at least two sensors which are arranged on the scraper, and which are arranged next to one another in a plane extending orthogonally to the direction of travel.

11. The self-propelled construction machine of claim 1, wherein the controller is configured:
   upon detecting the second milling operation, to verify whether the at least first sensor or the at least second sensor is arranged closer to the previously milled milling cut, and then,
   in the second milling operation, for determining the milling depth, to use the measurements received from the at least third sensor and from the sensor which is arranged further away from the previously milled milling cut.

12. The self-propelled construction machine of claim 11, wherein:
the controller is configured to ascertain renewed milling in the first milling operation by determining whether a measurement value received from the at least first sensor or the at least second sensor that is arranged closer to the previously milled milling cut corresponds to the set milling depth.

13. A method for working ground pavements with a self-propelled construction machine comprising a milling drum for milling a milling cut during milling of ground pavement, wherein a first measuring device is associated with a first end side of the milling drum and a second measuring device is associated with a second end side of the milling drum, and each measuring device respectively measures a distance of the machine frame relative to the ground pavement, the method comprising:
determining a milling depth, in a first milling operation, via measurements performed by the first measuring device and the second measuring device;
automatically detecting a second milling operation, in which the milling drum is positioned on an as-yet non-milled milling cut that is arranged next to a previously milled milling cut; and
responsive to automatic detection of the second milling operation, using measurements performed by a third measuring device to determine the milling depth, in lieu of measurements performed by one or more of the first measuring device and the second measuring device.

14. The method of claim 13, wherein one or more of measured values and specified values for one or more of the first measuring device and the second measuring device are evaluated for detecting the second milling operation.

15. The method of claim 14, wherein a difference between the specified and the measured values of the one or more of the first measuring device and the second measuring device is calculated and compared with a specified reference value for detecting the second milling operation.

16. The method of claim 13, further comprising verifying whether the second milling operation applies by comparing current GPS data associated with the construction machine with stored GPS data associated with one or more previously milled milling cuts.

17. The method of claim 13, further comprising:
detecting a profile of the ground surface in front of the milling drum as seen in the direction of travel, and
ascertaining, via the detected profile, whether the second milling operation applies.

18. The method of claim 13, further comprising, responsive to detecting the second milling operation, verifying whether the first measuring device or the second measuring device is arranged closer to the previously milled milling cut, and then,
in the second milling operation, for determining the milling depth, using the measurements received from the third measuring device and from the measuring device which is arranged further away from the previously milled milling cut.

19. The method of claim 18, further comprising:
automatically ascertaining renewed milling in the first milling operation by determining whether a measurement value received from the first measuring device or the second measuring device that is arranged closer to the previously milled milling cut corresponds to the set milling depth.

20. The method of claim 19, further comprising, for ascertaining renewed milling in the first milling operation, comparing one or more of a time and a distance travelled by the construction machine with a respective specified value.

* * * * *